US012325405B2

(12) United States Patent
Lim

(10) Patent No.: US 12,325,405 B2
(45) Date of Patent: Jun. 10, 2025

(54) ELECTRONIC BRAKE FOR VEHICLE AND CONTROL METHOD THEREFOR

(71) Applicant: HYUNDAI MOBIS Co., Ltd., Seoul (KR)

(72) Inventor: Jae Il Lim, Yongin-si (KR)

(73) Assignee: HYUNDAI MOBIS Co., Ltd., Seoul (KR)

( * ) Notice: Subject to any disclaimer, the term of this patent is extended or adjusted under 35 U.S.C. 154(b) by 452 days.

(21) Appl. No.: 17/851,529

(22) Filed: Jun. 28, 2022

(65) Prior Publication Data
US 2023/0145707 A1 May 11, 2023

(30) Foreign Application Priority Data
Nov. 8, 2021 (KR) .................. 10-2021-0152594

(51) Int. Cl.
B60T 8/40 (2006.01)
B60T 13/66 (2006.01)
B60T 13/68 (2006.01)

(52) U.S. Cl.
CPC .......... B60T 8/4081 (2013.01); B60T 13/662 (2013.01); B60T 13/686 (2013.01)

(58) Field of Classification Search
CPC ...... B60T 8/4081; B60T 17/22; B60T 13/686; B60T 13/662; B60T 8/172; B60T 7/042; B60T 13/14; B60T 13/74; B60T 13/745; B60T 17/221; B60T 2201/03; B60T 2270/40; B60T 2270/402
See application file for complete search history.

(56) References Cited

U.S. PATENT DOCUMENTS

| | | | |
|---|---|---|---|
| 9,623,853 B2 * | 4/2017 | Kim | B60T 8/4081 |
| 10,682,999 B2 * | 6/2020 | Yamamoto | B60T 13/686 |
| 2016/0082937 A1 * | 3/2016 | Nakaoka | B60T 8/321 303/15 |
| 2021/0394729 A1 * | 12/2021 | Seol | B60T 8/17616 |

FOREIGN PATENT DOCUMENTS

GB 2161561 A * 1/1986 ............ B60T 13/145

* cited by examiner

Primary Examiner — Pamela Rodriguez
(74) Attorney, Agent, or Firm — Morgan, Lewis & Bockius LLP

(57) ABSTRACT

An electronic brake for a vehicle and a control method therefor according to an embodiment of the present disclosure are able to stably generate a required braking force by controlling an auxiliary brake device by an auxiliary controller, if a flow path on the auxiliary brake device that connects a main brake device and a wheel brake is unintentionally closed.

14 Claims, 3 Drawing Sheets

ELECTRONIC BRAKE FOR VEHICLE AND CONTROL METHOD THEREFOR

CROSS-REFERENCE TO RELATED APPLICATION

This application claims priority to and the benefit of Korean Patent Application No. 10-2021-0152594, filed on Nov. 8, 2021, the disclosure of which is incorporated herein by reference in its entirety.

TECHNICAL FIELD

The present disclosure relates to an electronic brake for a vehicle and a control method therefor.

BACKGROUND

This section provides background information related to the present disclosure which is not necessarily prior art.

An electronic brake forms a braking force for a wheel brake mechanism using a motor. A brake device including a motor pressurizes a working fluid within a hydraulic circuit of the electronic brake. The pressurized working fluid is selectively carried to a plurality of wheel brake mechanisms through a flow pathway which is formed by opening and closing a plurality of valves on the hydraulic circuit of the electronic brake. The plurality of wheel brake mechanisms slows down or stops wheels by using a hydraulic pressure of the carried working fluid.

An auxiliary brake device was proposed which is configured to generate a braking pressure by serving as a backup for a main brake device of a vehicle when a failure occurs to the main brake device. As a backup for a main controller for controlling the main brake device, an auxiliary controller for controlling the auxiliary brake device may be mounted along with the auxiliary brake device. The auxiliary brake system is configured to go into cooperative control, if the power output of the main brake device does not meet a set condition. Here, the phrase "the power output of the main brake device does not meet a set condition" may mean that something is wrong with the main brake device.

However, even with an auxiliary brake device, a brake device for a vehicle is not able to generate a braking force required to safely run the vehicle, if something is wrong with the auxiliary brake device.

SUMMARY

According to at least one aspect, the present disclosure provides a control method for an electronic brake for a vehicle, the electronic brake comprising a first brake device including a first pressurizer, that is configured to supply hydraulic pressure to a plurality of wheel brakes, a second brake device including a second pressurizer, that is connected between a first wheel brake group including at least part of the plurality of wheel brakes and configured to supply hydraulic pressure to the first wheel brake group, and a control unit including a first controller for controlling the first brake device and a second controller for controlling the second brake device, the method comprising: determining, by the control unit, whether the first brake device is operating normally; determining, by the control unit, whether a connecting flow path connecting an outlet of the first pressurizer and an outlet of the second pressurizer is closed; calculating, by the control unit, a first required braking force which the first wheel brake group needs to apply to the vehicle; and a pressure increasing step in which, based on a determination that the first brake device is operating normally and the connecting flow path is closed, the second controller controls the second brake device so that the second pressure device pressurizes fluid, based on the first required braking force being greater than a braking force applied to the vehicle by the first wheel brake group.

According to another aspect, the present disclosure provides an electronic brake for a vehicle, the electronic brake comprising: a first brake device including a first pressurizer, that is configured to supply hydraulic pressure to a plurality of wheel brakes; a second brake device including a second pressurizer, that is connected between a first wheel brake group including at least part of the plurality of wheel brakes and configured to supply hydraulic pressure to the first wheel brake group; and a control unit including a receiver for receiving at least one of a stroke signal of a brake pedal or a brake signal generated by an autonomous driving system, a first controller for controlling the first brake device, a second controller for controlling the second brake device, a device status determination unit for determining whether the first brake device is operating normally, a connection status determination unit for determining whether a connecting flow path connecting an outlet of the first pressurizer and an outlet of the second pressurizer is closed, and a required braking force calculator for calculating a first required braking force which the first wheel brake group needs to apply to the vehicle.

DETAILED DESCRIPTION

Figure 1:
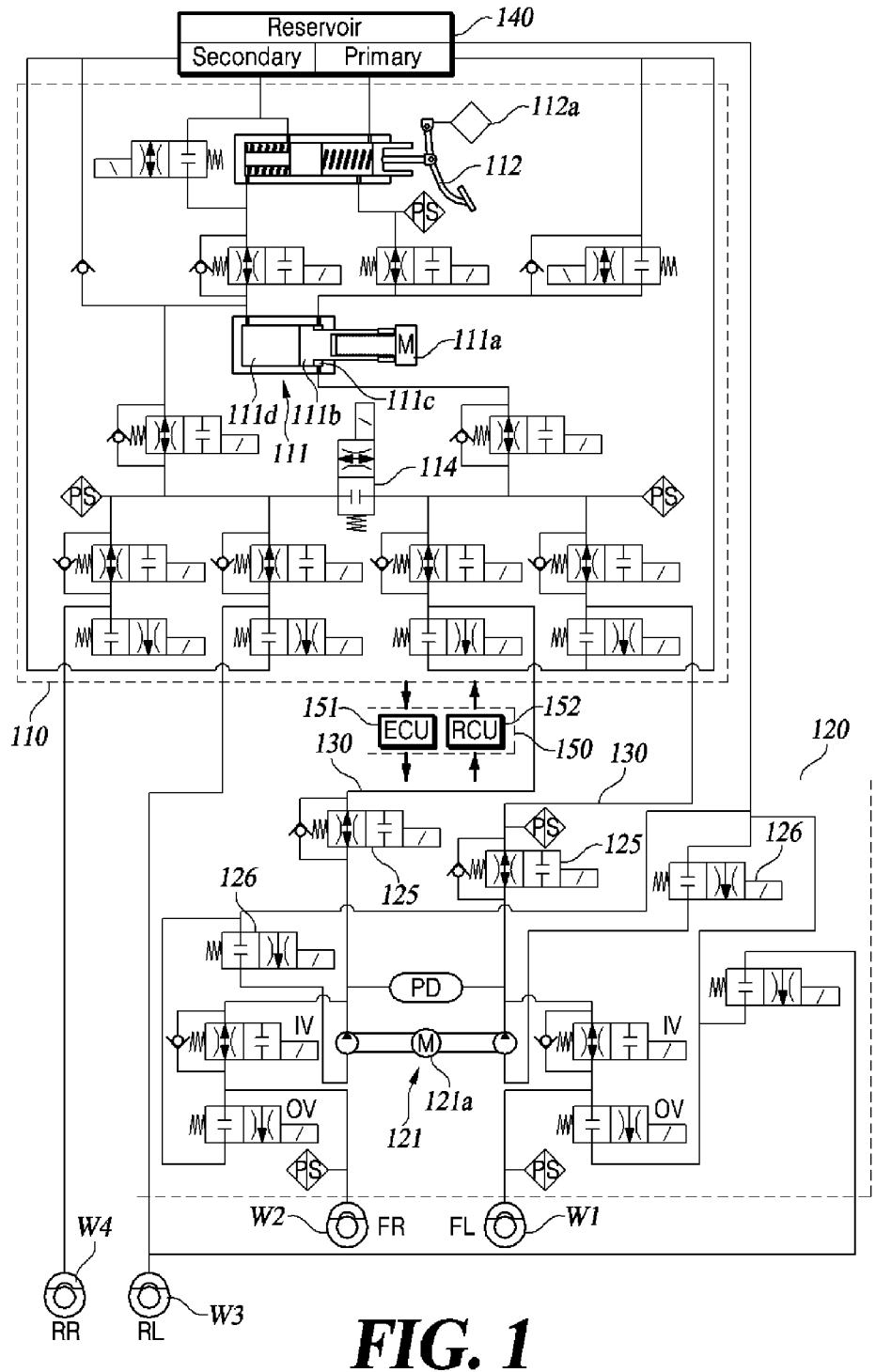
FIG. 1 is a hydraulic circuit diagram of an electronic brake for a vehicle according to an embodiment of the present disclosure.

An electronic brake for a vehicle and a control method therefor according to an embodiment of the present disclosure are able to stably generate a required braking force by controlling an auxiliary brake device by an auxiliary controller, if a flow path on the auxiliary brake device that connects a main brake device and a wheel brake is unintentionally closed.

The aspects of the present disclosure are not limited to the foregoing, and other aspects not mentioned herein will be able to be clearly understood by those skilled in the art from the following description.

Hereinafter, some exemplary embodiments of the present disclosure will be described in detail with reference to the accompanying drawings. In the following description, like reference numerals preferably designate like elements, although the elements are shown in different drawings. Further, in the following description of some embodiments, a detailed description of known functions and configurations incorporated therein will be omitted for the purpose of clarity and for brevity.

Additionally, various terms such as first, second, A, B, (a), (b), etc., are used solely to differentiate one component from the other but not to imply or suggest the substances, order, or sequence of the components. Throughout this specification, when a part 'includes' or 'comprises' a component, the part is meant to further include other components, not to exclude thereof unless specifically stated to the contrary. The terms such as 'unit', 'module', and the like refer to one or more units for processing at least one function or operation, which may be implemented by hardware, software, or a combination thereof.

FIG. 1 is a hydraulic circuit diagram of an electronic brake for a vehicle according to an embodiment of the present disclosure.

Referring to FIG. 1, an electronic brake for a vehicle that is controlled by a control method according to an embodiment of the present disclosure includes a first brake device 110, a second brake device 120, and a control unit 150.

A plurality of wheel brakes w1, w2, w3, and w4 is configured to restrict the rotation of the wheels by using a hydraulic pressure generated by the brake devices. The plurality of wheel brakes w1, w2, w3, and w4 may be mounted to different wheels and apply a braking force to the mounted wheels. The wheel brakes w1, w2, w3, and w4 may be caliper-type brakes or drum-type brakes. In this disclosure, wheel brakes w1 and w2 mounted to front wheels are referred to as front wheel brakes w1 and w2, and wheel brakes w3, and w4 mounted to rear wheels are referred to as rear wheel brakes w3 and w4. The plurality of wheel brakes w1, w2, w3, and w4 is configured to receive a hydraulic pressure from the first brake device 110 and/or the second brake device 120 and apply a required braking force to the vehicle. The required braking force is a target braking force which the electronic brake of the vehicle needs to apply to the vehicle, which may be calculated based on a stroke signal generated by a pedal stroke sensor 112a mounted on a brake pedal 112 or a brake signal generated by an autonomous driving system (310 of FIG. 3).

The first brake device 110 is configured to supply hydraulic pressure to the plurality of wheel brakes w1, w2, w3, and w4. The first brake device 110 includes a first pressurizer 111 configured to pressurize fluid, and the entire or part of a first valve group configured to selectively supply hydraulic pressure to the plurality of wheel brakes w1, w2, w3, and w4.

The first pressurizer 111 includes all or part of a first motor 111a, a piston 111b, and a hydraulic chamber 111c and 111d. The first pressurizer 111 may be driven by the first motor 111a. The first pressurizer 111 may include a power train (not shown) that converts a torque of the first motor 111a into a translational force on the piston 111b. The power train is a mechanism that converts rotary motion into translational motion, for example, by using a ball screw and a screw nut. The piston 111b may be configured to move forward or backward depending on the direction of rotation of the first motor 111a. In this disclosure, the opposite side of the first motor 111a is referred to as "front side", and the side of the first motor 111a is referred to as "rear side". A hydraulic chamber 111c and 111d, which is a space where fluid is pressurized, may be divided into two by the piston 111b. A hydraulic chamber 111c and 111d positioned at the rear of the piston 111b is referred to as a first hydraulic chamber 111c, and a hydraulic chamber 111c and 111d positioned at the front of the piston 111b is referred to as a second hydraulic chamber 111d. When the piston 111b moves backward, a fluid in the first hydraulic chamber 111c may be pressurized, and the fluid may be supplied into the second hydraulic chamber 111d. When the piston 111b moves forward, a fluid in the second hydraulic chamber 111d may be pressurized, and the fluid may be supplied into the first hydraulic chamber 111c. However, the pressurizer of this disclosure is not limited to such a double-acting pressurizer. The pressurizer may be a single-acting pressurizer, for example, which is configured such that fluid is not pressurized in the hydraulic chamber 111c and fluid is supplied to the second hydraulic chamber 111d. The first pressurizer 111 may include a cylinder whose inner periphery adjoins the outer periphery of the piston 111b. The piston 111b may slide to the front or rear of the cylinder depending on the direction of rotation of the first motor 111a.

The first valve group may include a plurality of solenoid valves that are configured such that their open and closed states vary with applied current. A fluid flow pathway in the first brake device 110 may vary depending on the open and closed states of the first valve group, that is, whether they are open or closed or how much they are open or closed.

The second brake device 120 may produce a hydraulic pressure equivalent to the required braking force by serving as a backup for the first brake device 110. When the first brake device 110 is operating normally, the first brake device 110 may generate a hydraulic pressure equivalent to the required braking force, and when the first brake device 110 is not operating normally, the second brake device 120 may generate a braking force by serving as a backup for the first brake device 110. The second brake device 120 is configured to supply hydraulic pressure to a first wheel brake group w1 and w2. The first wheel brake group w1 and w2 includes at least part of the plurality of wheel brakes w1, w2, w3, and w4. In this disclosure, part of the plurality of wheel brakes w1, w2, w3, and w4, exclusive of the first wheel brake group w3 and w4, is referred to as a second wheel brake group w3 and w4. The first wheel brake group w1 and w2 according to an embodiment of the present disclosure includes front wheel brakes w1 and w2, and the second wheel brake group w3 and w4 includes rear wheel brakes w3 and w4. The first hydraulic chamber 111c may communicate fluid to the front wheel brakes w1 and w2, and the second hydraulic chamber 111d may communicate fluid to the rear wheel brakes w3 and w4. The second brake device 120 includes a second pressurizer 121 configured to pressurize fluid, and the entire or part of a second valve group configured to selectively supply hydraulic pressure to the plurality of wheel brakes w1, w2, w3, and w4. The second brake device 120 is connected between the first wheel brake group w1 and w2 and the first brake device 110.

The second pressurizer 121 includes all or part of a second motor 121a and the hydraulic chamber 111c and 111 d. The second pressurizer 121 may include a first pump and a second pump that are configured to alternately pressurize fluid as an eccentric shaft of the second motor 121a rotates. The second pressurizer 121 may pressurize a fluid supplied from an oil reservoir 140 and discharge it to the wheel brakes w1, w2, w3, and w4. An inlet flow path valve portion 126 may be disposed on a flow path connecting the second pressurizer 121 and the oil reservoir 140. When the inlet flow path valve unit 126 is opened, fluid may be supplied from the oil reservoir 140 to the second pressurizer 121.

In this disclosure, a flow path connecting an outlet of the first pressurizer 111 and an outlet of the second pressurizer 121 is referred to as a connecting flow path 130. The second valve group may include a block valve unit 125 disposed on the connecting flow path 130. The block valve unit 125 may include a check valve that allows fluid to flow from the outlet of the first pressurizer 111 to the first wheel brake group w1 and w2 and stops the fluid from flowing from the first wheel brake group w1 and w2 to the first pressurizer 111. When the block valve unit 125 is closed, a high-pressure fluid pressurized by the second pressurizer 121 may be supplied to the first wheel brake group w1 and w2 without leaking to the first brake device 110. When the second brake device 120 forms a braking pressure by serving as a backup for the first brake device 110, the control unit 150 may close the block valve unit 125 and drive the second motor 121a of the second pressurizer 121, in order to increase the braking force. Moreover, the first controller 151 may control the first pressurizer 111 so that the first pressurizer 111 pressurizes fluid. In this way, the fluid pressurized by the second pressurizer 121 and the fluid pressurized by the first pressurizer 111 may be delivered to the first wheel brake group w1 and w2 past the check valve. The block valve unit 125 may be a normal open-type solenoid valve which is open at normal times. The "normal times" refer to times during which the current applied to the block valve unit 125 is no higher than a predetermined value, for example. When the first brake device 110 is not operating normally, the control unit 150 may apply a current to the block valve unit 125 to close the block valve unit 125 and control the second pressurizer 121 and/or the second valve group.

A split valve 114 may be disposed on a flow path connecting the second wheel brake group w3 and w4 and the outlet of the first pressurizer 111 on the side of the first wheel brake group w1 and w2. The split valve 114 may be disposed on a flow path connecting the first hydraulic chamber 111c and the rear wheel brakes w3 and w4. When the split valve 114 is opened, a hydraulic pressure formed in the first hydraulic chamber 111c may be delivered to the rear wheel brakes w3 and w4, and a hydraulic pressure formed in the second hydraulic chamber 111d may be delivered to the front wheel brakes w1 and w2. On the contrary, when the split valve 114 is closed, the hydraulic pressure formed in the first hydraulic chamber 111c is not delivered to the rear wheel brakes w3 and w4, and the hydraulic pressure formed in the second hydraulic chamber 111d is not delivered to the front wheel brakes w1 and w2.

The control unit 150 includes a first controller 151 for controlling the first brake device 110 and a second controller 152 for controlling the second brake device 120. The first controller 151 may control the open and closed states of the first valve group by adjusting the current applied to the first valve group. The first controller 151 may control the rotation of the first motor 111a by adjusting the phase or intensity of the current supplied to the first motor 111a. Likewise, the second controller 152 may control the open and closed states of the second valve group and the rotation of the second motor 121a.

The first controller 151 and the second controller 152 of the control unit 150 according to an exemplary embodiment of the present disclosure may be a processor (e.g., computer, microprocessor, CPU, ASIC, circuitry, logic circuits, etc.). Each controller may be implemented by a non-transitory memory storing, e.g., a program(s), software instructions reproducing algorithms, etc., which, when executed, performs various functions described hereinafter, and a processor configured to execute the program(s), software instructions reproducing algorithms, etc. Herein, the memory and the processor may be implemented as separate semiconductor circuits. Alternatively, the memory and the processor may be implemented as a single integrated semiconductor circuit. The processor may embody one or more processor(s).

Figure 2:
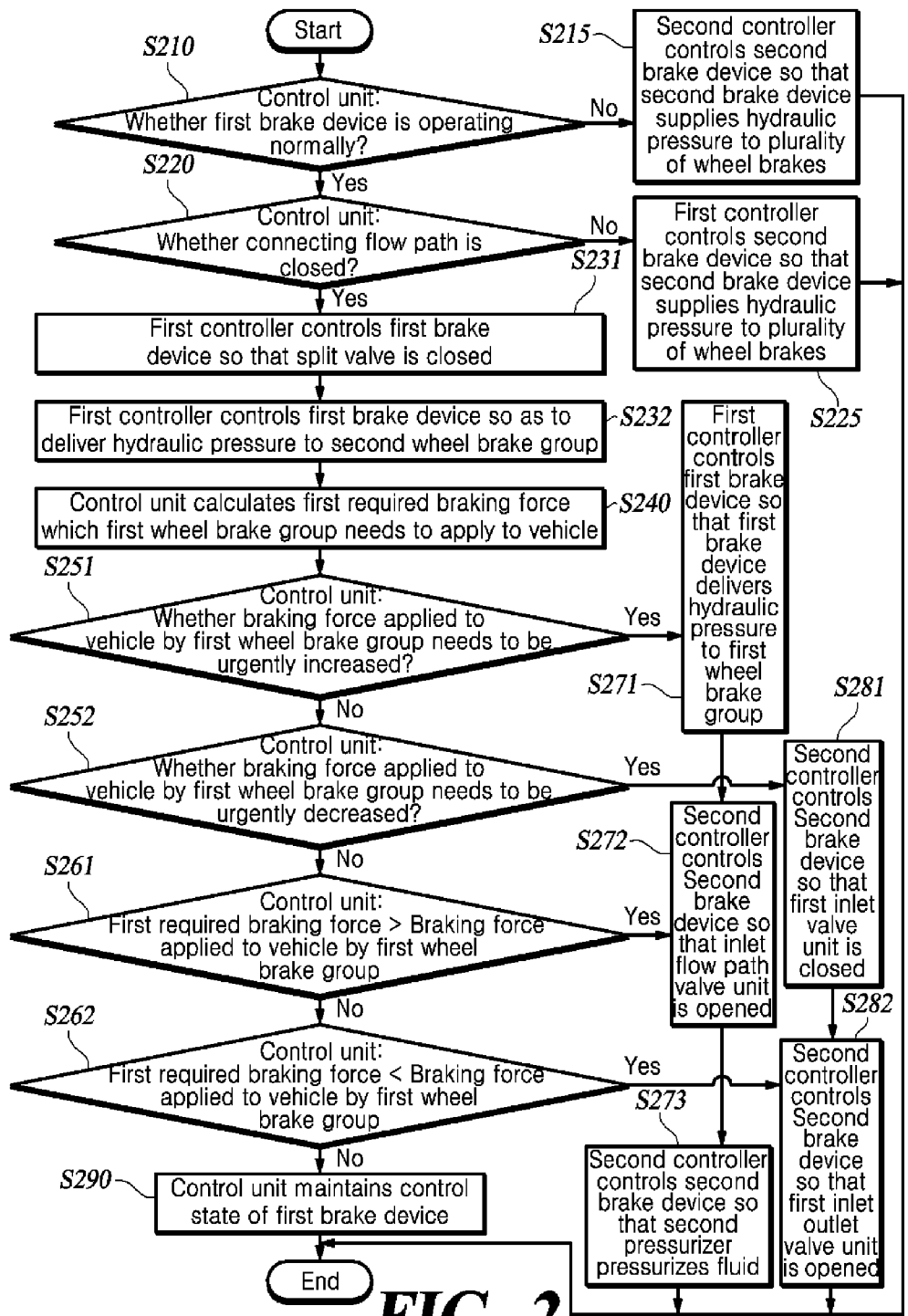
FIG. 2 is a sequence diagram of a control method according to an embodiment of the present disclosure.

FIG. 2 is a sequence diagram of a control method according to an embodiment of the present disclosure.

Referring to FIG. 2, the control unit 150 may determine whether the first brake device 110 is operating normally (S210). For example, the control unit 150 may receive a pedal stroke signal and a pressure measurement from a pressure sensor disposed on the first brake device 110, and determine the state of the first brake device 110 by comparing whether the pressure measurement has a value equivalent to a required braking force calculated based on the pedal stroke signal. When the first brake device 110 is not operating normally, the second controller 152 controls the second brake device 120 so that the second brake device 120 supplies hydraulic pressure to the plurality of wheel brakes w1, w2, w3, and w4 by serving as a backup for the first brake device 110 (S215). When the first brake device 110 is operating normally, the control unit 150 determines whether the connecting flow path 130 is closed (S220). For example, if a pressure measured at the connecting flow path 130 is lower than a pressure corresponding to the current applied to the first motor 111a by the first controller 151, the control unit 150 may determine that the connecting flow path 130 is closed. If it is determined that the connecting flow path 130 is not closed, the first controller 151 controls the first brake device 110 so that the first brake device 110 supplies hydraulic pressure to the plurality of wheel brakes w1, w2, w3, and w4 (S225). If the connecting flow path 130, which is a flow path connecting the first brake device 110 and the first wheel brake group w1 and w2, is closed, the hydraulic pressure formed in the first brake device 110 is not delivered to the first wheel brake group w1 and w2. In this case, even if the first brake device 110 is operating normally, the second brake device 120 needs to deliver hydraulic pressure to the first wheel brake group w1 and w2 by serving as a backup for the first brake device 110. The connecting flow path 130 may be closed when a plunger (not shown) of the block valve unit 125 gets stuck, for example. This stucking may occur when the second controller 152 does not apply a proper amount of current to the block valve unit 125 due to foreign substances clogging the inside of the block valve unit 125 or a failure in the circuit of the second controller 152.

The control unit 150 calculates a first required braking force which the first wheel brake group w1 and w2 needs to apply to the vehicle (S240). If it is determined that the first brake device 110 is operating normally and the connecting flow path 130 is closed, the control unit 150 determines whether the braking force applied to the vehicle by the first wheel brake group w1 and w2 needs to be increased (S261). If the braking force applied to the vehicle by the first wheel brake group w1 and w2 is greater than the first required braking force, the control unit 150 may determine that the braking force needs to be increased. Once it is determined that the braking force needs to be increased, the second controller 152 controls the second brake device 120 so that the inlet flow path valve unit 126 is opened (S272). As the inlet flow path valve unit 126 is opened, fluid may be supplied from the oil reservoir 140 to the second pressurizer 121. The second controller 152 controls the second brake device 120 so that the second pressurizer 121 pressurizes fluid (S273). The second controller 152 may drive the second motor 121a so that second pressurizer 121 pressurizes fluid. In this way, the fluid pressure formed in the second pressurizer 121 may be delivered to the wheel brakes w1, w2, w3, and w4.

If it is determined that the first brake device 110 is operating normally and the connecting flow path 130 is closed, the control unit 150 determines whether the braking force applied to the vehicle by the wheel brake group w1 and w2 needs to be decreased (S262). If the braking force applied to the vehicle by the first wheel brake group w1 and w2 is smaller than the first required braking force, the control unit 150 may determine that the braking force needs to be decreased. Once it is determined that the braking force needs to be decreased, the first controller 151 or the second controller 152 controls the second brake device 120 so that fluid is communicated between the first wheel brake group w1 and w2 and the oil reservoir 140. For example, the second controller 152 controls the second brake device 120 so that a first outlet valve unit OV is opened (S282). In this way, the fluid in the first wheel brake group w1, w2, w3, and w4 is delivered to the oil reservoir 140, thereby reducing the hydraulic pressure in the first wheel brake group w1, w2, w3, and w4.

In the control method according to an embodiment of the present disclosure, the control unit 150 may determine whether the braking force applied to the vehicle by the first wheel brake group w1 and w2 needs to be urgently increased (S251). The control unit 150 may determine whether the braking force needs to be urgently increased based on a brake signal generated by the autonomous driving system 310 or a pedal stroke signal generated by the pedal stroke sensor 112a. For example, if the stroke speed of the brake pedal 112 is equal to or higher than a preset value based on the pedal stroke signal, the control unit 150 may determine that the braking force needs to be urgently increased. For example, the brake signal may be an emergency brake signal the autonomous driving system 310 generates when a lidar sensor (not shown) detects a pedestrian near the vehicle.

Once it is determined that the braking force applied to the vehicle by the first wheel brake group w1 and w2 needs to be urgently increased, the first controller 151 controls the first brake device 110 so that the first brake device 110 supplies hydraulic pressure to the first wheel brake group w1 and w2 (S271). Moreover, the steps S272 and S273 are performed by the control unit 150. That is, the control unit 150 controls the second pressurizer 121 and the like so that the second pressurizer 121 pressurizes fluid. In this case, since the first brake device 110 is operating normally, a high-pressure fluid pressurized by the first brake device 110 may be delivered to the first wheel brake group w1 and w2 past the check valve on the block valve unit 125. Along with the hydraulic pressure formed by the second hydraulic device in the steps S271 and S273, the hydraulic pressure formed by the first hydraulic device is delivered to the first wheel brake group w1 and w2. In this way, a high hydraulic pressure may be supplied to the wheel brakes w1, w2, w3, and w4 when there is a need to urgently increase the braking force.

In the control method according to an embodiment of the present disclosure, the control unit 150 may determine whether the braking force applied to the vehicle by the first wheel brake group w1 and w2 needs to be urgently decreased (S252). For example, the control unit 150 may determine that the braking force needs to be urgently decreased if the stroke speed of an accelerator pedal is equal to or higher than a preset value. Once it is determined that the braking force applied to the vehicle by the first wheel brake group w1 and w2 needs to be urgently decreased, the second controller 152 controls the second brake device 120 so that a first inlet valve unit IV is closed (S281). Once the first inlet valve unit IV is closed, no hydraulic pressure is delivered to the wheel brakes w1, w2, w3, and w4 from the first pressurizer 111 or the second pressurizer 121. Also, the step S282 is performed by the control unit 150. Since the first inlet valve unit IV is closed and the first outlet valve unit OV is opened, the hydraulic pressure in the first wheel brake group w1 and w2 may be rapidly reduced.

In the control method according to an embodiment of the present disclosure, if it is determined that the first brake device 110 is operating normally and the connecting flow path 130 is closed, the first controller 151 controls the first brake device 110 so that the split valve 114 is closed (S231). The first controller 151 controls the first brake device 110 so as to deliver hydraulic pressure to the second wheel brake group w3 and w4 (S232). Unless there is no failure that causes the flow path connecting the first pressurizer 111 and the second wheel brake group w3 and w4 to be unintentionally closed, the first pressurizer 111 may supply hydraulic pressure to the second wheel brake group w3 and w4 (S231 and S232).

According to the above-described control method, even if a failure occurs in which the block valve unit 125 gets stuck while closed, the electronic brake for a vehicle may stably generate a required braking force.

Figure 3:
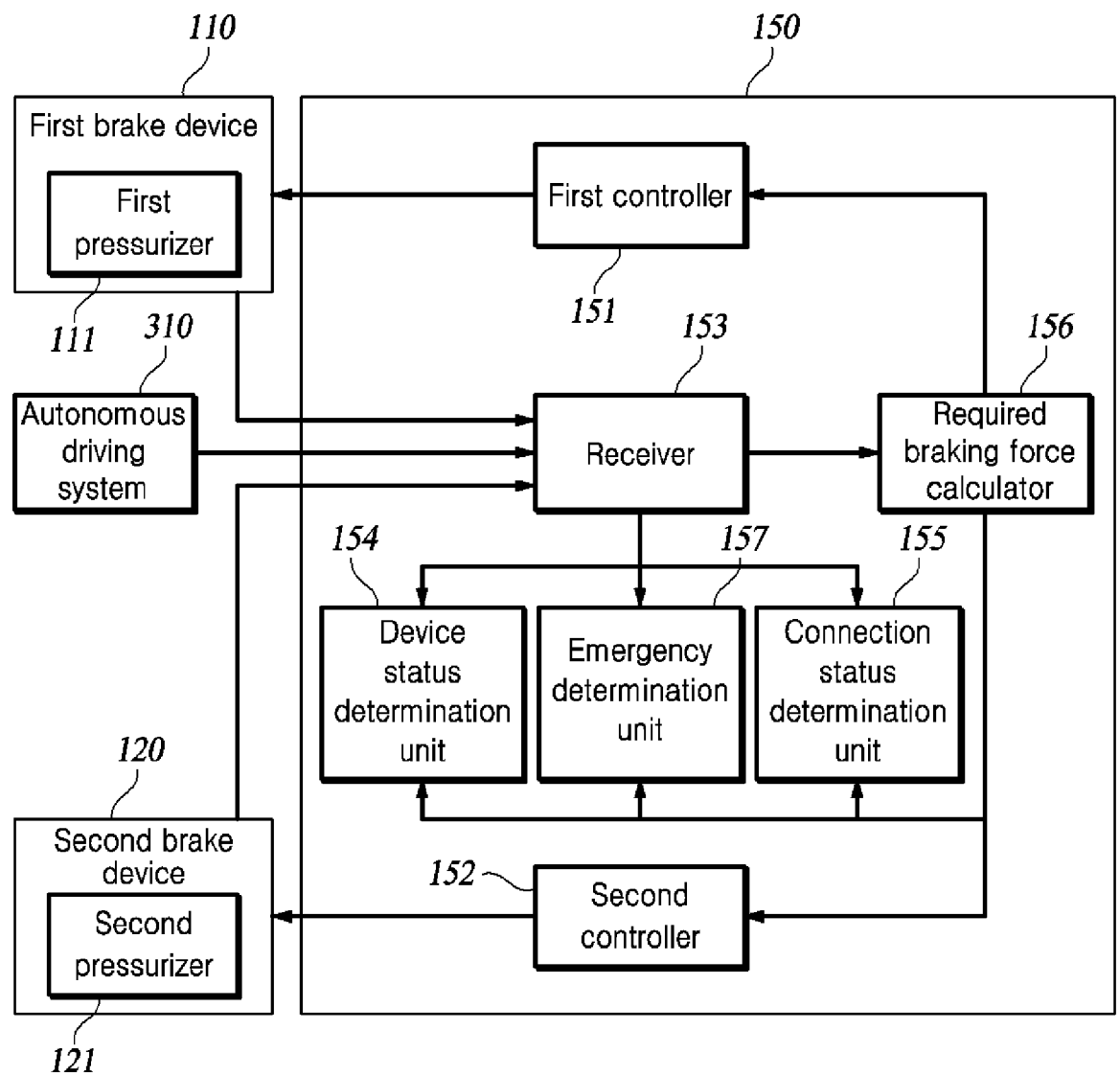
FIG. 3 is a block diagram schematically showing a configuration of an electronic brake for a vehicle according to an embodiment of the present disclosure.

FIG. 3 is a block diagram schematically showing a configuration of an electronic brake for a vehicle according to an embodiment of the present disclosure.

The above-described control method may be performed by an electronic brake for a vehicle according to an embodiment of the present disclosure. The electronic brake for a vehicle according to the embodiment to be described below may include a configuration of the electronic brake for a vehicle that is controlled by the above-described control method. The configuration and functions of the electronic brake for a vehicle to be described below are identical to the configuration and functions of the electronic brake for a vehicle that is controlled by the above-described control method, so redundant description will be omitted.

Referring to FIG. 3, an electronic brake for a vehicle according to an embodiment of the present disclosure includes a first brake device 110, a second brake device 120, and a control unit 150.

The control unit 150 may include all or part of a receiver 153, a first controller 151, a second controller 152, a device status determination unit 154, a connection status determination unit 155, a required braking force calculator 156, and an emergency determination unit 157. According to an exemplary embodiment of the present disclosure, the control unit 150 may include a processor (e.g., computer, microprocessor, CPU, ASIC, circuitry, logic circuits, etc.) and an associated non-transitory memory storing software instructions which, when executed by the processor, provides the functionalities of the first controller 151, the second controller 152, the device status determination unit 154, the connection status determination unit 155, the required braking force calculator 156, and the emergency determination unit 157.

The receiver 153 receives at least one of a stroke signal of the brake pedal 112 and a brake signal generated by the autonomous driving system 310. A hydraulic sensor of the first brake device 110 may send information on a pressure value at a predetermined position inside the first brake device 110. The receiver 153 may receive this information on the pressure value. The required braking force calculator 156 calculates a first required braking force which the first wheel brake group w1 and w2 needs to apply to the vehicle. The required braking force calculator 156 may calculate a required braking force based on at least one of the stroke signal and the brake signal. The device status determination unit 154 determines whether the first brake device 110 is operating normally. If a hydraulic pressure at a predetermined position on the first brake device 110 is not equivalent to the first required braking force, determination unit 154 may determine that the first brake device 110 is not operating normally. The hydraulic pressure at the predetermined position on the first brake device 110 equivalent to the first required braking force may be stored in the form of a look-up table (LUT) in a memory (not shown) of the control unit 150. The connection status determination unit 155 determines whether the connecting flow path 130 is closed or not. For example, if a pressure measured at the connecting flow path 130 is lower than a pressure value corresponding to the current applied to the first motor 111a by the controller 151, the connection status determination unit 155 may determine that the connecting flow path 130 is closed. The control unit 150 may determine whether the braking force applied to the vehicle by the plurality of wheel brakes w1, w2, w3, and w4 needs to be urgently increased or decreased, based on at least one of the stroke signal and the brake signal. For example, if the stroke speed of the brake pedal 112 is equal to or higher than a preset value based on the stroke signal of the brake pedal 112, the emergency determination unit 157 may determine that the braking force needs to be urgently increased. The brake signal may be an emergency brake signal the autonomous driving system 310 generates when a lidar sensor detects a pedestrian near the vehicle. If the stroke speed of the accelerator pedal is equal to or higher than a preset value, the control unit 150 may determine that the braking force needs to be urgently decreased.

An electronic brake for a vehicle and a control method therefor according to an embodiment of the present disclosure have the effect of stably generating a required braking force by controlling an auxiliary brake device by an auxiliary controller, if a flow path on the auxiliary brake device that connects a main brake device and a wheel brake is unintentionally closed.

Although exemplary embodiments of the present disclosure have been described for illustrative purposes, those skilled in the art will appreciate that various modifications, additions, and substitutions are possible, without departing from the idea and scope of the claimed invention. Therefore, exemplary embodiments of the present disclosure have been described for the sake of brevity and clarity. The scope of the technical idea of the present embodiments is not limited by the illustrations. Accordingly, one of ordinary skill would understand the scope of the claimed invention is not to be limited by the above explicitly described embodiments but by the claims and equivalents thereof.

What is claimed is:

1. A control method for an electronic brake for a vehicle, the electronic brake comprising a first brake device including a first pressurizer, that is configured to supply hydraulic pressure to a plurality of wheel brakes, a second brake device including a second pressurizer, that is connected between a first wheel brake group including at least part of the plurality of wheel brakes and configured to supply hydraulic pressure to the first wheel brake group, and a control unit including a first controller for controlling the first brake device and a second controller for controlling the second brake device, the method comprising:
    determining, by the control unit, whether the first brake device is operating normally;
    determining, by the control unit, whether a connecting flow path connecting an outlet of the first pressurizer and an outlet of the second pressurizer is closed;
    calculating, by the control unit, a first required braking force which the first wheel brake group needs to apply to the vehicle; and
    a pressure increasing step in which, based on a determination that the first brake device is operating normally and the connecting flow path is closed, the second controller controls the second brake device so that the second pressurizer device pressurizes fluid, based on the first required braking force being greater than a braking force applied to the vehicle by the first wheel brake group.

2. The control method of claim 1, further comprising a pressure reducing step in which, based on a determination that the first brake device is operating normally and the connecting flow path is closed, the second controller controls the second brake device so that fluid is communicated between the first wheel brake group and an oil reservoir, based on the first required braking force being smaller than a braking force applied to the vehicle by the first wheel brake group.

3. The control method of claim 2, wherein the pressure increasing step comprises an inlet flow path opening step in which the second controller controls the second brake device so that an inlet flow path valve unit disposed on a flow path connecting an inlet of the second pressurizer and the oil reservoir is opened.

4. The control method of claim 3, wherein the pressure reducing step comprises a first outlet valve opening step in which the second controller controls the second brake device so that a first outlet valve unit disposed on a flow path connecting an outlet of the second pressurizer, the first wheel brake group, and the oil reservoir is opened.

5. The control method of claim 4, wherein the pressure increasing step further comprises a cooperative pressurization step in which the first controller controls the first brake device so that the first brake device supplies hydraulic pressure to the first wheel brake group.

6. The control method of claim 5, wherein the pressure reducing step further comprises a first inlet valve closing step in which the second controller controls the second brake device so that a first inlet valve unit disposed on a flow path connecting an outlet of the second pressurizer and the plurality of wheel brakes is closed.

7. The control method of claim 6, further comprising an emergency pressure increase determination step in which the control unit determines whether a braking force applied to the vehicle by the first wheel brake group needs to be urgently increased,
    wherein, based on a determination that the braking force needs to be urgently increased, the inlet flow path opening step and the cooperative pressurization step are performed.

8. The control method of claim 7, further comprising an emergency pressure reduction determination step in which the control unit determines whether the braking force applied to the vehicle by the first wheel brake group needs to be urgently decreased,
    wherein, based on a determination that the braking force needs to be urgently decreased, the first outlet valve opening step and the first inlet valve closing step are performed.

9. The control method of claim 5, comprising, based on a determination that the first brake device is operating normally and the connecting flow path is not closed, controlling the first brake device by the first controller so that the first brake device supplies hydraulic pressure to the plurality of wheel brakes.

10. The control method of claim 1, further comprising, based on a determination that the first brake device is operating normally and the connecting flow path is closed, controlling the first brake device by the first controller so that a split valve disposed on a flow path connecting a second wheel brake group is closed, wherein the second wheel brake group includes at least part of the plurality of wheel brakes, exclusive of the first wheel brake group.

11. The control method of claim 10, further comprising controlling the first brake device by the first controller so that the first brake device delivers hydraulic pressure to the second wheel brake group, while the split valve is closed.

12. The control method of claim 1, comprising, based on a determination that first brake device is not operating normally, controlling the second brake device by the second controller so that the second brake device supplies hydraulic pressure to the plurality of wheel brakes.

13. An electronic brake for a vehicle, the electronic brake comprising:
- a first brake device including a first pressurizer, that is configured to supply hydraulic pressure to a plurality of wheel brakes;
- a second brake device including a second pressurizer, that is connected between a first wheel brake group including at least part of the plurality of wheel brakes and configured to supply hydraulic pressure to the first wheel brake group; and
- a control unit including a receiver for receiving at least one of a stroke signal of a brake pedal or a brake signal generated by an autonomous driving system, a first controller for controlling the first brake device, a second controller for controlling the second brake device, a device status determination unit for determining whether the first brake device is operating normally, a connection status determination unit for determining whether a connecting flow path connecting an outlet of the first pressurizer and an outlet of the second pressurizer is closed, and a required braking force calculator for calculating a first required braking force which the first wheel brake group needs to apply to the vehicle.

14. The electronic brake of claim 13, wherein the control unit further comprises an emergency determination unit for determining whether a braking force applied to the vehicle by the plurality of wheel brakes needs to be urgently increased or decreased, based on at least one of the stroke signal or the brake signal.

* * * * *